June 11, 1968     R. G. LE TOURNEAU     3,387,502
GEAR REDUCTION DRIVE UNITS EMBODIED IN VEHICLE WHEELS
Filed March 1, 1966     2 Sheets-Sheet 1

INVENTOR.
Robert G. LeTourneau
BY Wm. T. Wofford
Attorney

June 11, 1968 R. G. LE TOURNEAU 3,387,502
GEAR REDUCTION DRIVE UNITS EMBODIED IN VEHICLE WHEELS
Filed March 1, 1966 2 Sheets-Sheet 2

INVENTOR.
Robert G. LeTourneau
BY Wm. T. Wofford
Attorney

United States Patent Office 3,387,502
Patented June 11, 1968

3,387,502
GEAR REDUCTION DRIVE UNITS EMBODIED
IN VEHICLE WHEELS
Robert G. LeTourneau, P.O. Box 2307,
Longview, Tex. 75601
Filed Mar. 1, 1966, Ser. No. 530,892
2 Claims. (Cl. 74—391)

ABSTRACT OF THE DISCLOSURE

Arrangement for improving separation of foreign particles from lubricant fluid in a vehicle wheel which embodies a gear reduction drive unit and wherein the entire lubricant fluid supply is either contained within a plurality of rotating housings or otherwise arranged so as to be agitated and circulated as and when the wheel is rotated. The improvement provides a sump housing that essentially does not rotate but provides some circulation, and an arrangement of lubricant fluid circulation passages to accomplish circulation of the lubricant fluid through an intermediate chamber of reduced agitation and from there to the sump housing.

---

My invention relates to improvements in gear reduction units embodied in vehicle wheels, and particularly to improvements in the lubrication systems for such units.

Traction units for heavy duty off-road type work vehicles, such as earthworking machines, have been developed wherein power is supplied by electric motors driving gear reduction units embodied in the vehicle wheels. A lubricating fluid or oil fills one or more oil reservoirs which surround the various gears and bearings inside the wheel embodied gear reduction units.

As is common to the lubricating systems of mechanical devices, foreign particles tend to accumulate in the oil with the passage of time. Since foreign particles frequently are detrimental to mechanical elements such as gears and bearings, it is advantageous to use means for cleaning or changing the oil.

Some types of mechanical apparatus have oil cleaning systems wherein the foreign particles are continuously separated from the oil. In force feed lubricating systems, for example, filtering devices are commonly used for this purpose. In the more simplified lubricating systems in instances where there is a stationary housing that contains the gears and bearings (such as a crank case in an internal combustion engine) an oil sump may be provided in the stationary housing, such sump will contain a volume of relatively motionless oil so that the particles may precipitate from the oil under the influence of gravity.

In wheel embodied gear reduction units, however, the rotation of the wheel continually agitates the enclosed lubricating fluid or oil. Therefore, the use of simple oil sumps like those of machines with stationary housings is precluded. Moreover, the use of a force feed circulating system with filtering means to remove foreign particles is not considered to be a desirable approach to the solution of the problem.

It is accordingly the general object of my invention to provide improved gear reduction drive units embodied in vehicle wheels.

Another object of my invention is to provide in gear reduction units embodied in vehicle wheels, means for effectively removing foreign particles from the lubricating fluid or oil contained therein.

These and other objects are effected by my invention as will be apparent from the following description, taken in accordance with the accompanying drawings, in which.

Figure 1:
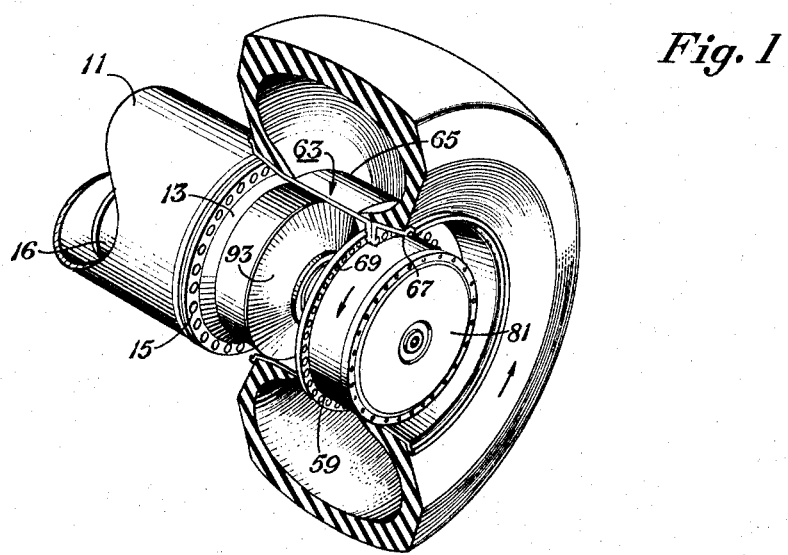
FIG. 1 is a fragmentary perspective view of a gear reduction drive unit embodied in a vehicle wheel and which utilizes my invention in accordance with a preferred embodiment thereof.

Referring initially to FIG. 1, the numeral 11 designates the inner region of an axle and the numeral 13 designates an outer region thereof. Axle regions 11, 13 are connected with the plurality of stud bolts to enable assembly and disassembly.

The inner region 11 of the axle supports two horizontally aligned electric motors 16 (see FIG. 2) that are secured to a vertical support wall 18 by stud bolts 17. Each of the motors has an output pinion 19 which is partially supported by bearings 21 that are interposed between the motor shaft and vertical support wall 18. Both output pinions engage an input gear 23 which is secured to a primary drive shaft 25. Relative circumferential movements between the input gear 23 and driveshaft 25 are prevented by means of the interconnecting spline regions on each of these members.

Figure 7:
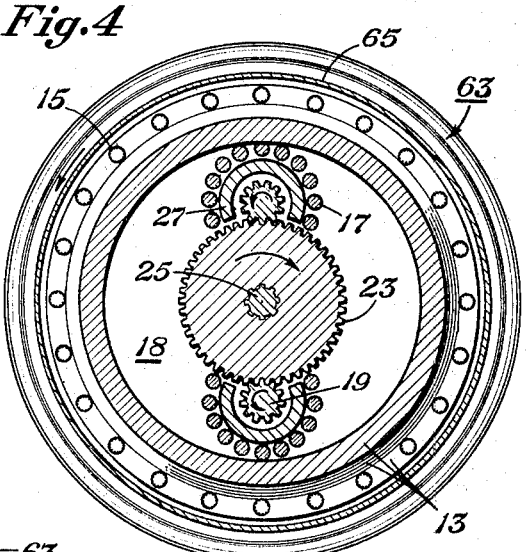
FIG. 7 is a cross sectional view as seen looking along the lines VII—VII of FIG. 2.

The cooperative relationship between the output pinions 19 of electric motors 16 and the input gear 23 of drive shaft 25 may be seen with reference to FIG. 7, as well as the horse shoe shaped shields 27 which extend from the vertically positioned support wall 18. The upper one of the output pinions 19 may be rotated in a counterclockwise direction (as shown in FIG. 7) and the lower one of the output pinions 19 is rotated in the counterclockwise direction so that the input gear 23 of drive shaft 25 is rotated in a clockwise direction. Electric motors 16 are reversible to enable the drive shaft 25 to be rotated in either the clockwise or the counterclockwise direction.

Figure 2:
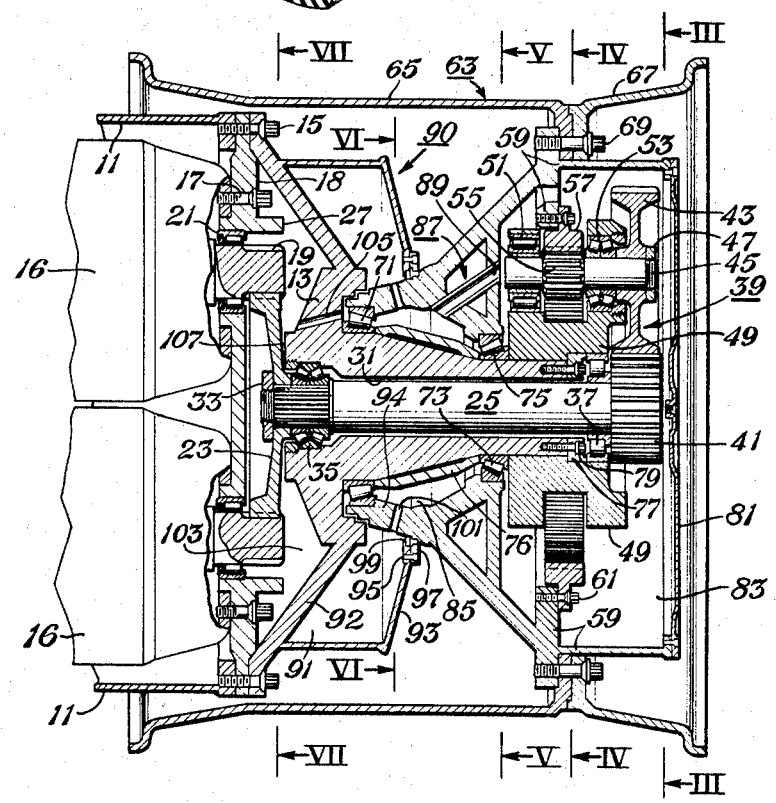
FIG. 2 is a view in longitudinal section of the apparatus of FIG. 1.

As shown in FIG. 2, drive shaft 25 is inserted in an aperture 31 which extends axially through the outer region 13 of the axle. Suitable means, such as a threaded retainer 33, secure the input gear 23 to drive shaft 25. Inner and outer bearings 35, 37 are used to rotatably support the drive shaft 25 inside the aperture 31 of the axle.

Figure 3:
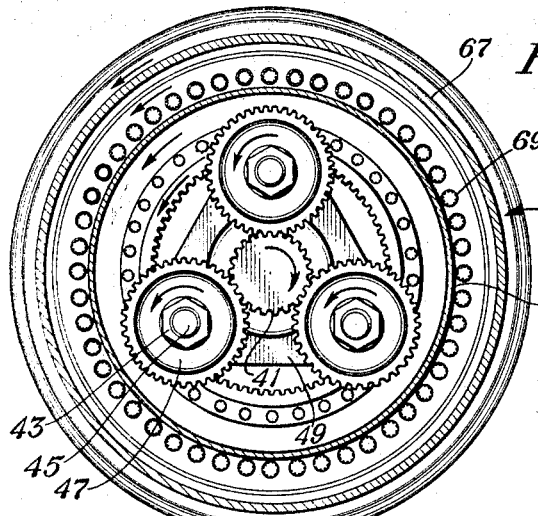
FIG. 3 is a cross sectional view as seen looking along the lines III—III of FIG. 2.

Gear means 39 are connected with the end of primary drive shaft 25 opposite input gear 23 to reduce speed of rotation of the wheel with respect to the drive shaft. Such gear means preferably includes an output gear 41 on the drive shaft which meshes with one or more input gears 43 (three are shown in FIG. 3) that are secured to and rotate one or more secondary drive shafts 45. Output gear 41 on the primary drive shaft 25 engages the three input gears 43 that are rigidly secured to the secondary drive shafts 45. Retainer means 47 secure the input gears 43 to their respective secondary drive shafts 45.

Figure 4:
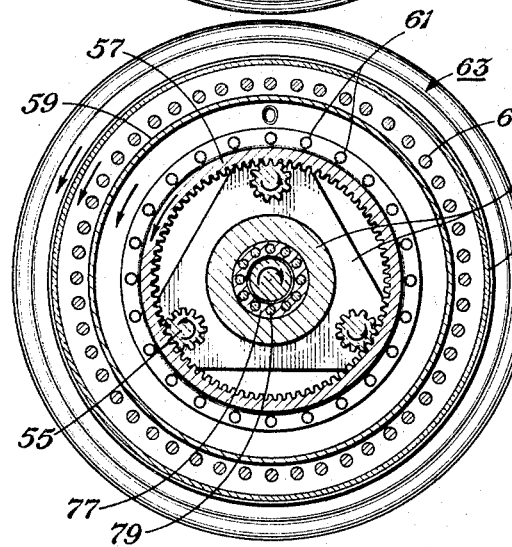
FIG. 4 is a cross sectional view as seen looking along the lines IV—IV of FIG. 2.
Figure 5:
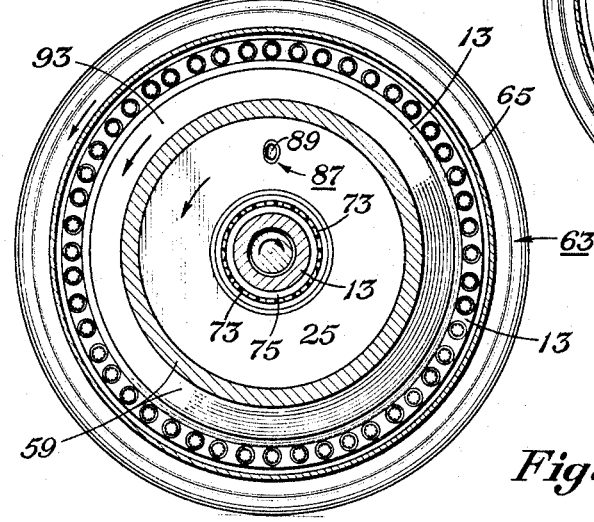
FIG. 5 is a cross sectional view as seen looking along the lines V—V of FIG. 2.

Secondary drive shafts 45 are rotatably assembled within a support body 49, which is preferably triangular as shown in the cross sectional views of FIGS. 3 and 4. Each of the secondary drive shafts 45 is journaled on support body 49 by means of respective inner and outer bearings 51, 53.

Interposed between bearings 51, 53 on each secondary drive shaft 45 is an output pinion 55. Each of the output pinions 55 engages a common internal gear 57, as may be best seen with reference to the cross sectional view of FIG. 4.

Internal gear 57 is secured by means of stud bolts 61 to a wheel core 59 that rotatably surrounds gear means 39 and portions of the outer region 13 of the axle, as may be best seen in FIG. 4. The rim 63 of the wheel is divided into inner and outer sections 65, 67 which are secured to each other and to the core 59 of the wheel, preferably by means of stud bolts 69 as may be seen in FIGS. 2, 3 and 4.

The wheel core 59 is rotatably secured to the outer region 13 of the axle by means of inner and outer bearings 71, 73, the axial position of which is partially established by a spacer 76. The support body 49 is wedged against the inner race 75 of bearings 73 by a retainer ring 77, which is visible in FIG. 2 and FIG. 4. Cap screws 79 secure the retainer ring to the outer region 13 of the axle.

The wheel core 59 has an outer, radially extending plate 81, and an outer oil reservoir 83 is formed by the wheel core around the gear means 39 and portions of the outer region 13 of the axle. An intermediate chamber 85 is formed between the outer region 13 of the axle and wheel core 59, between the bearings 71, 73.

Referring again to FIG. 2, an inner oil reservoir 103 is formed between the vertical support wall 18 and a portion of the outer region 13 of the axle. Passages 105 interconnect inner oil reservoir 103 with the spaces surrounding bearings 71. Moreover, another passage 107 interconnects inner oil reservoir 103 with the annular space separating drive shaft 25 and the aperture 31 in the outer region 13 of the axle. Thus, oil is free to flow between the inner reservoir 103 and the intermediate chamber 85 as well as between the inner reservoir 103 and the outer reservoir 83. In addition, oil may flow between the intermediate chamber 85 and the outer reservoir 83 via the spaces between the rollers of bearing 73. Further passage means 87 in the form of a conduit 89 interconnecting the intermediate chamber 85 and the outer reservoir 83 is provided to enhance oil circulation therebetween.

A stationary annular housing portion 90 is secured to the outer region 13 of the axle and has an outer wall portion 93 that sealingly engages the wheel core 59. Fastener means 95 engages a seal retainer 97 and a seal 99 is thereby retained in the assembly to prevent the flow of oil from within the housing portion 90 to the exterior of the wheel core. The stationary housing portion 90, together with an annular wall portion 92 of the axle outer region 13, and an annular portion of the wheel core 59, form a stationary sump chamber 91.

Figure 6:
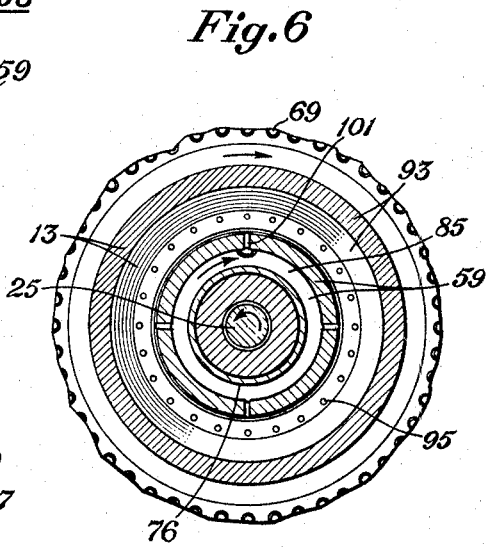
FIG. 6 is a cross sectional view as seen looking along the lines VI—VI of FIG. 2.

Oil may flow between the intermediate chamber 85 and the sump chamber 91 through the spaces that separate the rollers of bearing 71. A plurality of apertures 101 (see FIGS. 2 and 6) are formed in the wheel core 59 to function as additional oil flow passages between intermediate chamber 85 and oil sump chamber 91.

In operation, the electric motors 16 are energized by a power source (not shown) such that their output pinions 19 are rotated, as shown for example in FIG. 7. The input gear 23 of primary drive shaft 25 is rotated by means of engagement with the output pinions 19 of electric motors 16, and thus primary drive shaft 25 and output gear 41 are rotated (see FIG. 3). The secondary drive shafts 45 are rotated by means of the engagement of their input gears 43 with the output gear 41 of primary drive shaft 25. The output pinions 55 of secondary drive shafts 45 (see especially FIGS. 2 and 4) engage and rotate the internal gear 57.

Since internal gear 57 is secured as previously explained to the wheel core 59 of the apparatus, the rim 63 of the wheel and thus the tire of the apparatus are rotated. Since the direction of rotation of the output pinions 19 of the electric motors 16 may be reversed, the wheel and tire may be rotated in either the clockwise or counterclockwise directions.

Lubricating fluid or oil fills the outer oil reservoir 83, the inner reservoir 103, and the intermediate chamber 83 to the approximate center line of primary drive shaft 25, and since these reservoirs and the chamber are interconnected as previously explained, the various bearings and gears of the apparatus receive adequate lubrication. During rotation of the wheel core 59 there is considerable turbulence of the oil inside the outer reservoir due to both wheel and gear rotation, and at the same time there is considerable turbulence of the oil inside the inner reservoir 103 due to gear rotation. This turbulence enhances suspension of foreign particles in the oil and promotes some interflow of the oil between the reservoirs and also between the reservoirs and the intermediate chamber. The turbulence of oil inside the intermediate chamber 85 is much less than that within the reservoirs 83, 103, so that foreign particles in the oil within the intermediate chamber tend to precipitate. Further, the oil within the intermediate chamber 85 can flow via apertures 101 into the sump chamber 91, where further precipitation occurs. There is sufficient turbulence created at the radially innermost region of the sump chamber due to rotation of the wheel core portion 94 to provide some oil interflow from the sump chamber 91. However, there is essentially no turbulence at the bottom region of the sump chamber, so that precipitated foreign particles that reach this region will remain there. In other words, interflow of oil into the intermediate chamber 85 from the oil reservoir 83, 103, and into the sump chamber 91 causes foreign particles in the oil to be transferred into the sump chamber where they are precipitated by the influence of gravity. Precipitation of foreign particles in the intermediate chamber 85 and the sump chamber 91 will continue after the wheel rotation is stopped. Consequently, the oil that actually contacts the parts to be lubricated in the reservoirs is kept relatively clean during long and continued usage of the wheel apparatus.

It should be apparent from the foregoing that by the present invention I have provided improved gear reduction drive units embodied in vehicle wheels which have significant advantages.

The use of an intermediate chamber which receives oil from oil reservoirs of a gear reduction drive unit embodied in a vehicle wheel and provides a region of low turbulence in the oil interflow within which foreign particles will tend to precipitate, with this intermediate chamber communicating with a sump chamber in a manner such that the flow of fluid to and from the sump chamber is very slow, achieves effective separation of foreign particles from the oil.

The arrangement described above does not involve any additional mechanical parts that are subject to mechanical failure, and it is consequently not only very near fail proof, but also requires essentially no maintenance.

In brief, the improved gear reduction drive units embodied in vehicle wheels in accordance with my invention exhibit a lubrication and oil cleaning arrangement which is simple, economical, and effective.

The foregoing disclosure and the showings made in the drawings are merely illustrative of the principles of this invention and are not to be interpreted in a limiting sense.

I claim:

1. A gear reduction drive unit embodied in a vehicle wheel, comprising:
   (a) a vertical support wall;
   (b) an axle outer region having an annular wall portion fixed to said support wall and forming therewith an inner oil reservoir;
   (c) a drive shaft extending through and journaled in an axial aperture in said axle outer region;
   (d) an input gear mounted on said drive shaft and disposed for rotation within said inner oil reservoir;
   (e) a wheel core structure journaled by means of first and second axially spaced bearings on said axle outer region;
   (f) means including a wall portion of said wheel core structure and a wheel core plate forming an outer oil reservoir;

(g) gear reduction means disposed within said outer reservoir and coupling said wheel core structure with said drive shaft;
(h) first passage means including an annulus between said drive shaft and said axle outer region axial aperture permitting oil interflow between said inner and outer reservoirs;
(i) said wheel core structure and said axle outer region having respective surface portions disposed between said axially spaced bearings and forming an annular intermediate chamber;
(j) second passage means communicating between said inner reservoir and said intermediate chamber permitting oil interflow therebetween;
(k) third passage means communicating between said outer reservoir and said intermediate chamber permitting oil interflow therebetween;
(l) a stationary housing including a wall portion fixed to said axle outer region annular wall portion and a wall portion engaging said wheel core structure in dynamic sealing relation, said stationary housing, together with said axle outer region annular wall portion and a portion of said wheel core structure forming a sump chamber at least a portion of which is disposed below the level of said intermediate chamber; and,
(m) fourth passage means communicating between said intermediate chamber and said sump chamber.

2. The apparatus as defined by claim 1, wherein said second passage means includes one or more apertures in said axle outer region annular wall portion and one of said axially spaced bearings, and said third passage means includes one or more apertures in said wheel core structure and the other of said axially spaced bearings, and said fourth passage means includes a plurality of apertures in said wheel core structure.

References Cited

UNITED STATES PATENTS

| | | | |
|---|---|---|---|
| 1,768,225 | 6/1930 | Whitney | 180—43 XR |
| 2,244,875 | 6/1941 | Framhein. | |
| 2,463,349 | 3/1949 | Baner | 74—665 |
| 2,726,726 | 12/1955 | LeTourneau | 180—43 |
| 2,941,423 | 6/1960 | Armington et al. | 180—43 XR |
| 3,042,145 | 7/1962 | Bixby | 184—6 |
| 3,090,456 | 5/1963 | Blenkle | 180—43 |
| 3,157,239 | 11/1964 | Bernotas. | |

FOREIGN PATENTS

| | | |
|---|---|---|
| 929,515 | 6/1963 | Great Britain. |
| 931,180 | 7/1963 | Great Britain. |

T. R. HAMPSHIRE, *Assistant Examiner.*

FRED C. MATTERN, JR., *Primary Examiner.*

DONLEY J. STOCKING, *Examiner.*